United States Patent Office 2,966,960
Patented Jan. 3, 1961

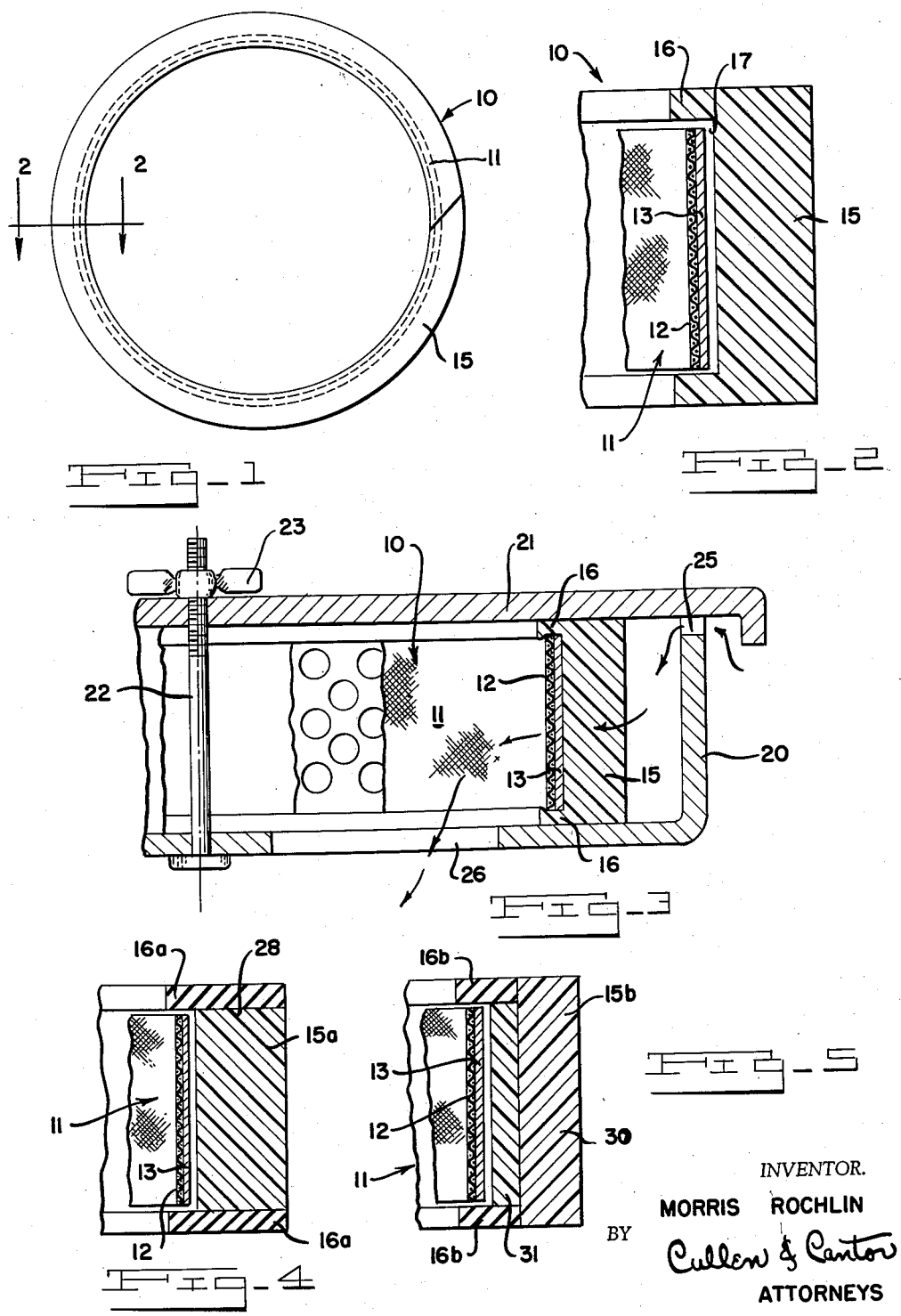

2,966,960
AIR FILTER

Morris Rochlin, Oak Park, Mich., assignor to Foamade Industries, Oak Park, Mich.

Filed Dec. 1, 1958, Ser. No. 777,465

2 Claims. (Cl. 183—73)

This invention relates to an air filter, and more particularly to an air filter useful with internal combustion engines, such as automotive type engines, for filtering the air drawn from the atmosphere into the carburetor.

In automotive and similar type internal combustion engines, it is conventional to use a filter to clean the air which is drawn from the atmosphere into the carburetor, of foreign particles. Two types of filters are currently used: One, an oil bath type of filter having a filter element submerged in a pool of oil; the second, a dry type of filter which has some sort of filtering material to catch the foreign particles. Both of the currently available filters are expensive and difficult to install. The dry type filters currently available must be stocked by the distributor, such as a gasoline station, in a large number of sizes to accommodate different size filters used for the engines of various types of automobiles.

Thus, it is an object of this invention to provide an inexpensive, easily replaceable, dry type filter which is divided into two component parts, one a permanent part, the other a replaceable part. The replaceable part is formed so that it can be easily removed and replaced for filter changes, and is so inexpensive that owners of automobiles can afford to change the filter regularly as is desirable for maximum engine efficiency.

Yet another object of this invention is to form such a filter and filter components which are adapted to be used in a variety of automotive engines, are light weight, flexible, and easily packaged in a small, nonbulky package, whereby they may be easily stocked by the distributor and whereby the shipping and handling costs are reduced to thereby reduce the ultimate cost of the filter.

These and other objects and advantages of this invention will become apparent upon reading the following description of which the attached drawings form a part.

With reference to the attached drawings,

Fig. 1 is a top view of the air filter.

Fig. 2 is an enlarged cross-sectional view of the air filter of Fig. 1 taken in the direction of arrows 2—2 of Fig. 1.

Fig. 3 is a fragmentary cross-section view of the air filter arranged in position in its air filter housing and shows how the completed assembly fits together.

Figs. 4 and 5 are modifications taken as if on line 2—2 of Fig. 1.

With reference to Figs. 1 and 2, the air filter is generally designated as 10. It is formed of an inside metal cylinder 11, which in turn is preferably formed in two layers 12 and 13, with the inner layer 12 being preferably of a wire mesh, such as screening material, and the outer layer 13 formed of a perforated thin metal sheet. The size of the wire mesh and of the sheet metal openings are not particularly critical, so long as the mesh and sheet metal are sufficiently rigid to hold their form under the heat encountered at the filter of a conventional engine and so long as they are large enough to freely pass the air. The two layers function as a fire wall to prevent back flashes from causing a fire.

The two layers are in contact with one another and may be secured together. The diameter of the cylinder will vary with the different model engines and different model housings that are used in internal combustion engines. But, one example of size is a cylinder which is approximately 10 inches in diameter and about 3 inches in axial length. Here the outer layer is perforated with closely spaced openings of about one-quarter inch in diameter and the screen mesh with closely spaced openings of about one-sixteenth inch in diameter.

A filtering component or filtering cylinder 15 is arranged to surround the metal cylinder 11. This cylinder is formed of an elongated strip of a flexible, foamed plastic material whose cells are opened into one another to provide numerous, closely spaced, free, but tortuous passageways from one face to the other, throughout the entire length of the strip.

One material found to be suitable for this purpose is that known as "Scott-Foam" which is the trademark of a product of the Scott Paper Company, and is a polyurethane foam which is treated with a suitable solvent to destroy the membranes which define each cell, thereby opening the cells into each other to provide a unitary, but open cellular structure throughout the entire mass of the polyurethane foam. The cells are indiscriminately spaced relative to one another and thus the remaining plastic structure, around the cells, serves to filter particles passing through it when air is passed through the structure.

This particular material, "Scott-Foam" is currently available in a cell or pore range of 10–80 pores per inch. The range of 10–15 pores per inch is coarse (larger cells), 30–45 pores per inch is medium, and 60–80 pores per inch is fine (small cells). The medium porosity seems to be most suitable in the structure described above.

Other plastic materials may also be found suitable for this purpose, provided that the plastic material is characterized by being somewhat flexible and resilient, cellular throughout its entire mass, with a relatively even size of cells in each particular segment of the mass, the cell structure being open so that the cells open into one another, and the material being impervious to the heat, foreign particles, grease and oils normally found in an automotive engine. The above mentioned "Scott-Foam" material, which is commercially available, does meet these qualifications, and hence, is described herein.

The filtering cylinder 15 is provided with gaskets 16 at each end of the cylinder, with the gaskets extending inwardly a short distance to overlap the ends of the metal cylinder. In Figs. 2 and 3 the gaskets are formed integral with and of the same material as the filtering cylinder.

While the size may vary considerably, an example of the filtering cylinder may be of about an inch or two inches greater in diameter than that of a metal cylinder, and the axial dimension being slightly greater than the metal cylinder. Depending upon the size metal cylinder found with any particular make engine, the filtering cylinder may fit loosely over the metal and then compressed as will be described below, or may be stretched over the metal cylinder.

In operation, the filter 10 is inserted within a large, flat cup shaped housing 20, having openings 26 at the bottom for the passage of air. A cover 21 closes the cup. Openings 25 are provided at the upper edge of the cup 20 so that air may pass over the upper edge of the cup, under the cover, into the housing, through the filter 10 and out through openings 26, as indicated by arrows in Fig. 3.

The cover may be secured to the housing cup by means of a long bolt 22 and a wing nut 23 which threadedly engages the bolt to draw the cover tightly to the cup.

Thus, it can be seen that the cup 21 presses against the gasket 16 to compress the gasket tightly into contact with the upper and lower edges of the metal cylinder (see Fig. 3), to thereby require the air entering the cup to pass through the filter cylinder 15 and metal cylinder.

The filter is used until it is dirty, as for example, for 3000 miles, then the garage attendant servicing the car can remove the cover 21 simply by unscrewing the wing nut 23, pull out the filter 10, remove the filtering cylinder 15, and replace it with a new filtering cylinder. The entire replacement operation would take about two minutes, and the filtering cylinder, because it is resilient and flexible, can be of a size which will fit a large number of different sizes of metal cylinders within a reasonable dimensional tolerance.

In the modification of Fig. 4, the gasket 16a is of a different material than the filtering cylinder 15a and is adhesively secured to the filtering cylinder at 28 by some suitable adhesive. For example, the gasket may be of a non-porous, highly resilient material, such as rubber, or the like, and being more highly resilient than the material of the filtering cylinder, will not be squashed down too flat by the pressure of the housing cover.

In Fig. 5, the filtering cylinder 15b may be formed of two layers 30 and 31, wherein the inside layer 31 may be of a fine porosity and the outer layer 30 may be of a coarse porosity so as to provide a filtering action whereby the coarse particles are filtered by the outside cylinder and the fine particles by the inside cylinder, thus more uniformly distributing the particles caught in the cylinder and increasing the life of the cylinder somewhat. As in this case of Fig. 4, the gasket 16b is adhesively secured to the cylinder 15b.

This invention may be further developed within the scope of the following attached claims. Accordingly, it is desired that the foregoing description be read as being merely illustrative of an operative embodiment of this invention and not in a strictly limiting sense.

I now claim:

1. A disposable filter element for use in a filter having a normally permanent, but removable, thin-walled metal element formed in a substantially cylindrical shape and having a plurality of openings formed therein for the passage of a fluid from the outside into the inside of the cylinder through its wall, and a permanent bottom member and a top member arranged at opposite ends of the metal element and including means for drawing one of the members towards the other for compressing the metal element axially and holding the metal element between the two members; said disposable filter element composing a strip of a flexible, resilient, foamed plastic material having the cells thereof opening into one another to provide numerous, closely spaced, free, but tortuous, passageways for the passage of fluid from one face of the strip to its opposite face throughout the entire strip, the strip being formed into a flexible, continuous, single thickness, uniform thickness, endless band of a size and shape to fit around the outside of the metal element, with the two elements being coaxial and with the filter element completely surrounding the wall of the metal element, the filter element being sufficiently resilient to compensate for differences in size and shape between the two elements; and an inwardly extending, continuous, annular flange formed integral with each end of the filter element, wherein the filter element in cross-section is U-shaped, with the flanges forming the legs of the U and permanently extending radially inwardly of the strip cylinder formation at substantially right angles thereto, the flanges each forming a permanent sealing gasket for being resiliently fitted over the opposite ends of the metal cylinder and for being compressed between the ends of the metal cylinder and the top and bottom members respectively, said filter element and its gaskets forming a complete, separate, flexible unit, which unit may be installed into the filter to surround said metal element and which may be removed therefrom to be disposed of as a unit when it becomes dirty.

2. A disposable filter element for surrounding a cylindrically shaped, perforated, metal element formed of thin metal, and comprising a strip of flexible, resilient, foamed plastic material having the cells thereof opening into one another to provide numerous, closely spaced, free but tortuous passageways for the passage of fluid from one face of the strip to the opposite face thereof throughout the entire strip; the ends of the strip being permanently joined together and the strip being permanently formed into a flexible, single thickness, endless band of a size to fit around the outside of the metal element, and the band being resiliently stretchable axially and radially whereby it may be placed in face to face contact with and around the outside of the metal element and it will compensate for differences in size and shape therebetween, the inside wall of the band being provided with a pair of integral, inwardly extending, continuous, annular flanges, one at each end of the band, and the band in cross-section being U-shaped, with the flanges forming the legs of the U and intersecting the strip at substantially right angles thereto to form a relatively sharp corner therebetween, and the band being resiliently stretchable and compressible in its axial direction, whereby the flanges may be fitted over and arranged in complete contact with the respective ends of the metal element to form sealing gaskets.

References Cited in the file of this patent

UNITED STATES PATENTS

| | | |
|---|---|---|
| 1,499,864 | Gordon | July 1, 1924 |
| 1,560,790 | Jordahl | Nov. 10, 1925 |
| 1,892,210 | Gordon | Dec. 27, 1932 |
| 2,027,681 | Durant et al. | Jan. 14, 1936 |
| 2,400,076 | Dauster | May 14, 1946 |
| 2,732,031 | Rabbitt et al. | Jan. 24, 1956 |
| 2,740,525 | Wehner | Apr. 3, 1956 |
| 2,742,160 | Fogwell | Apr. 17, 1956 |
| 2,770,241 | Winkler | Nov. 13, 1956 |

FOREIGN PATENTS

| | | |
|---|---|---|
| 754,834 | Great Britain | Aug. 15, 1956 |
| 543,951 | Canada | July 23, 1957 |
| 1,159,447 | France | Feb. 10, 1958 |